US012720035B2

(12) United States Patent
Li et al.

(10) Patent No.: US 12,720,035 B2
(45) Date of Patent: Aug. 25, 2026

(54) METHOD AND DEVICE FOR NAKED EYE 3D DISPLAYING VEHICLE INSTRUMENT

(71) Applicant: VARITRONIX (HEYUAN) DISPLAY TECHNOLOGY LTD., Heyuan City (CN)

(72) Inventors: Hongzhang Li, Heyuan City (CN); Zhongfu Cao, Heyuan City (CN); Huaiping Zhang, Heyuan City (CN); Haiqiang Zhong, Heyuan City (CN); Jinwu Chen, Heyuan City (CN); Dianyi Ruan, Heyuan City (CN)

(73) Assignee: VARITRONIX (HEYUAN) DISPLAY TECHNOLOGY LTD., Heyuan City (CN)

( * ) Notice: Subject to any disclaimer, the term of this patent is extended or adjusted under 35 U.S.C. 154(b) by 230 days.

(21) Appl. No.: 18/538,464

(22) Filed: Dec. 13, 2023

(65) Prior Publication Data

US 2024/0214545 A1 Jun. 27, 2024

(30) Foreign Application Priority Data

Dec. 21, 2022 (CN) ......................... 202211651220.1

(51) Int. Cl.
*H04N 13/302* (2018.01)
*G06T 15/20* (2011.01)
*H04N 13/385* (2018.01)

(52) U.S. Cl.
CPC ........... *H04N 13/302* (2018.05); *G06T 15/20* (2013.01); *H04N 13/385* (2018.05)

(58) Field of Classification Search
CPC .... H04N 13/302; H04N 13/385; G06T 15/20; B60K 35/211
See application file for complete search history.

(56) References Cited

U.S. PATENT DOCUMENTS 5,502,481 A * 3/1996 Dentinger .............. H04N 13/15 348/E13.058
6,556,236 B1 * 4/2003 Swift .................. H04N 13/337 348/E13.058

(Continued)

FOREIGN PATENT DOCUMENTS

CN 106218409 A 12/2016
CN 108600731 A 9/2018

(Continued)

OTHER PUBLICATIONS

International Office Action, Application No. JP 2023-206213, mailed Oct. 28, 2024, 6 pages. Machine Translated.

(Continued)

*Primary Examiner* — Charles L Beard
(74) *Attorney, Agent, or Firm* — CANTOR COLBURN LLP

(57) ABSTRACT

The present application relates to the field of naked eye 3D technology, provides a method and a device for naked eye 3D displaying a vehicle instrument, which includes: collecting a real-time eye position of an operator in a real time, generating a corresponding real-time visual interweaving image according to the real-time eye position, and displaying the real-time visual interweaving image on a display interface; identifying whether the operator is engaged in human behavior, if so, obtaining human behavior information of the operator; predicting a deviation interval of the operator according to the human behavior information, and generating and caching a viewing angle image set corresponding to the deviation interval; and compensating in response to the real-time visual interweaving image on the display interface according to the viewing angle image set.

8 Claims, 4 Drawing Sheets

(56) References Cited

U.S. PATENT DOCUMENTS 6,766,036 B1* 7/2004 Pryor ........................ G06T 7/73 348/169
9,465,226 B2* 10/2016 Osman ............... G02B 27/0093
9,690,099 B2* 6/2017 Bar-Zeev ............. G02B 27/017
10,178,380 B2 1/2019 Kang et al.
10,366,527 B2* 7/2019 Park ....................... H04N 13/31
10,613,810 B2* 4/2020 Wakamoto ............. B60K 35/22
10,713,948 B1* 7/2020 Kim ....................... G06V 40/20
10,733,921 B2* 8/2020 Jung ...................... B60K 35/60
10,775,540 B2* 9/2020 Song .................... H04N 13/354
11,040,619 B1* 6/2021 Martin .................. B60R 16/037
11,064,189 B2* 7/2021 Lu ............................ G09G 3/36
11,106,050 B2 8/2021 Yokoyama et al.
11,428,945 B2* 8/2022 Kim ....................... G01B 21/22
11,449,004 B2* 9/2022 Hornstein ............ H04N 13/351
11,562,550 B1* 1/2023 Asghar ................... G06F 3/012
11,868,672 B1* 1/2024 Dehkordi .............. G06F 40/169
12,086,308 B2* 9/2024 Kasarla .................. G06V 40/12
12,386,175 B1* 8/2025 Konttori ............ G02B 27/0093
12,401,779 B1* 8/2025 Konttori .............. H04N 13/117
12,505,683 B1* 12/2025 Carlsson .............. G06V 20/597
2001/0013971 A1* 8/2001 Kleinberger ........... H04N 13/38 348/E13.058
2004/0036763 A1* 2/2004 Swift ................... H04N 13/161 348/E13.058
2006/0125917 A1* 6/2006 Cha ...................... H04N 13/279 348/51
2007/0003162 A1* 1/2007 Miyoshi .................. G06T 15/20 382/276
2007/0188667 A1* 8/2007 Schwerdtner ........ H04N 13/305 348/E13.05
2009/0066786 A1* 3/2009 Landa .................. H04N 13/282 348/E13.001
2009/0273721 A1* 11/2009 Dhuey ..................... G02B 6/06 348/739
2009/0290079 A1* 11/2009 Evans .................... G02B 30/25 359/479
2010/0014053 A1* 1/2010 Brentnall, III ......... G03B 21/00 353/7
2010/0014711 A1* 1/2010 Camhi ...................... G06T 7/70 382/104
2010/0073636 A1* 3/2010 Sasaki .................... G06V 40/19 353/13
2010/0149073 A1* 6/2010 Chaum ............. G02B 27/0075 345/8
2010/0253766 A1* 10/2010 Mann ................... H04N 13/383 348/51
2010/0281439 A1* 11/2010 Markovic ................. G06T 3/20 715/863
2010/0315492 A1* 12/2010 Baik .................... H04N 13/366 348/51
2011/0032346 A1* 2/2011 Kleinberger ......... H04N 13/315 348/59
2011/0038418 A1* 2/2011 Pandit .................. H04N 19/543 375/E7.125
2011/0285622 A1* 11/2011 Marti ...................... G06T 15/20 345/158
2011/0285704 A1* 11/2011 Takeda ............... H04N 21/4854 345/419
2011/0313259 A1* 12/2011 Hatakeyama ............ A61B 5/18 600/300
2011/0316987 A1* 12/2011 Komoriya .......... H04N 21/4223 348/51
2013/0138392 A1* 5/2013 Kumon .................... G01C 9/00 702/152
2013/0222548 A1* 8/2013 Yang .................... H04N 13/243 345/1.3
2013/0307771 A1* 11/2013 Parker ..................... G06F 3/167 345/158
2013/0329007 A1* 12/2013 Zhang .................. H04N 19/597 348/43
2013/0342644 A1* 12/2013 Rusanovskyy ...... H04N 19/597 348/43
2014/0071120 A1* 3/2014 Lee ...................... H04N 13/341 345/419
2014/0091991 A1* 4/2014 An ....................... H04N 13/305 345/32
2014/0133567 A1* 5/2014 Rusanovskyy ........ H04N 19/30 375/240.16
2014/0176528 A1* 6/2014 Robbins ............. G02B 27/0103 345/419
2015/0002642 A1* 1/2015 Dressler .................... B60R 1/23 348/51
2015/0049266 A1* 2/2015 Muller ................. H04N 13/349 359/462
2015/0109429 A1* 4/2015 Inoue ....................... A61B 5/18 348/78
2015/0145977 A1* 5/2015 Hoffman .............. H04N 13/368 348/54
2015/0189256 A1* 7/2015 Stroetmann .......... H04N 13/366 348/54
2015/0235427 A1* 8/2015 Nobori ................. G02B 27/017 345/629
2015/0245017 A1* 8/2015 Di Censo ............. H04N 13/366 348/51
2015/0314682 A1* 11/2015 Enriquez Ortiz .. G02B 27/0093 701/49
2015/0323789 A1* 11/2015 Kuehne ................ B60K 35/232 359/630
2016/0173863 A1* 6/2016 Kang ................. G02B 27/0093 348/54
2016/0209647 A1* 7/2016 Fürsich ............. G02B 27/0075
2016/0219268 A1* 7/2016 Ström .................. H04N 13/398
2016/0282542 A1* 9/2016 Seo ........................ G02B 30/30
2016/0360187 A1* 12/2016 Smithwick ............. G02B 30/27
2017/0006279 A1* 1/2017 Eichenlaub .......... H04N 13/356
2017/0046880 A1* 2/2017 Kasazumi ............... G06F 3/013
2017/0054970 A1* 2/2017 Singh .................. B60K 35/211
2017/0171535 A1* 6/2017 Kim ..................... H04N 13/383
2017/0257622 A1* 9/2017 Seifert ................... G02B 30/31
2017/0280134 A1* 9/2017 Woods .................... G06T 7/248
2017/0302914 A1* 10/2017 Tonar .................. H04N 13/383
2018/0004289 A1* 1/2018 Wilson .................... G06F 1/163
2018/0081178 A1* 3/2018 Shpunt ................. H04N 13/383
2018/0096475 A1* 4/2018 Jemander ............... H04N 7/183
2018/0232866 A1* 8/2018 Weller ................... G02B 30/30
2018/0288393 A1* 10/2018 Yerli ................ H04N 21/21805
2018/0372923 A1* 12/2018 Wijaya ................... G02B 3/005
2019/0026936 A1* 1/2019 Gorur Sheshagiri ........................ G06F 3/0304
2019/0034731 A1* 1/2019 Lee .................... G02B 27/0101
2019/0065873 A1* 2/2019 Wang ................... G06V 40/168
2019/0137294 A1* 5/2019 Jung .................. G01C 21/3867
2019/0137770 A1* 5/2019 Huang .................... G06F 3/011
2019/0141314 A1* 5/2019 Huang ................... G02B 30/34
2019/0156553 A1* 5/2019 O'Brien ............... H04N 13/122
2019/0166359 A1* 5/2019 Lapstun ............... H04N 13/307
2019/0188828 A1* 6/2019 Aggarwal ............... G06T 15/20
2019/0197690 A1* 6/2019 Kang ........................ G06T 7/11
2019/0213429 A1* 7/2019 Sicconi ................. G06V 40/18
2019/0243151 A1* 8/2019 Hansen ............. G02B 27/0093
2020/0150444 A1* 5/2020 Nohara .................... G09G 5/36
2020/0175258 A1* 6/2020 Kang ................... G06V 40/167
2020/0175750 A1* 6/2020 Lee ...................... H04N 13/366
2020/0192093 A1* 6/2020 Lee .................... G02B 27/0103
2020/0192109 A1* 6/2020 Lee ........................ G02B 30/50
2020/0247321 A1* 8/2020 Kim .......................... B60R 1/04
2020/0319705 A1* 10/2020 Rohrbacher ........ G06F 3/04842
2020/0368616 A1* 11/2020 Delamont ............... A63F 13/52
2021/0065383 A1* 3/2021 Kang ....................... G06T 7/246
2021/0107356 A1* 4/2021 Watanabe ............... B60R 1/025
2021/0133431 A1* 5/2021 Kang ................... G06V 40/193
2021/0152812 A1* 5/2021 Ota ...................... H04N 13/383
2021/0182609 A1* 6/2021 Arar ......................... G06N 3/08
2021/0197835 A1* 7/2021 Maeda ................... G06N 20/00
2021/0223568 A1* 7/2021 Makinen ............ G02B 27/4272
2021/0271077 A1* 9/2021 Huber .................... G02B 30/29
2021/0271319 A1* 9/2021 Lussier ................ A61B 3/0041
2021/0323410 A1* 10/2021 Huber .................... B60K 35/23

(56) References Cited

U.S. PATENT DOCUMENTS

2021/0342613 A1* 11/2021 Wang ........................ G06N 3/09
2021/0374989 A1* 12/2021 Weinzaepfel ....... G06F 18/2413
2021/0407103 A1* 12/2021 Tang ...................... G06V 40/25
2022/0043509 A1* 2/2022 Dahl .................... G06V 20/597
2022/0055480 A1* 2/2022 Lee .................... G02B 27/0093
2022/0084316 A1* 3/2022 Wang ................... G06V 10/443
2022/0121839 A1* 4/2022 Tagra ................... G06V 40/172
2022/0187601 A1* 6/2022 Morozov ........... G02B 27/0081
2022/0197052 A1* 6/2022 Makinen .............. G02B 3/0037
2022/0264076 A1* 8/2022 Makinen .............. H04N 13/356
2022/0300072 A1* 9/2022 Arar .................... G06F 18/2148
2022/0308356 A1* 9/2022 Makinen .............. H04N 13/305
2022/0311990 A1* 9/2022 Makinen .............. G02B 3/0068
2022/0321867 A1* 10/2022 Makinen ................ G02B 30/27
2022/0357591 A1* 11/2022 Makinen .............. H04N 13/305
2022/0412759 A1* 12/2022 Neubecker ........... G01C 21/365
2023/0039764 A1* 2/2023 Wu ......................... G06T 7/246
2023/0045982 A1* 2/2023 Lapstun ............. G02B 27/0093
2023/0054024 A1* 2/2023 Oba ..................... A61B 5/7282
2023/0106673 A1* 4/2023 Asghar ................ G06V 20/584 382/104
2023/0130355 A1* 4/2023 Kang ................... G06V 40/166 382/118
2023/0156171 A1* 5/2023 Krener-Iversen .... H04N 13/368 348/51
2023/0156178 A1* 5/2023 Kusafuka ............. G06V 10/443 348/51
2023/0196874 A1* 6/2023 Quinn .................. G06V 40/161 382/103
2023/0227044 A1* 7/2023 Hara ..................... B60W 50/16 340/576
2023/0306739 A1* 9/2023 Yu .......................... G06V 10/82
2023/0324682 A1* 10/2023 Jarvenpaa .......... G02B 27/0093 385/37
2023/0388479 A1* 11/2023 Kusafuka ............... G03B 17/54
2023/0396755 A1* 12/2023 Kakeya .................. H04N 13/32
2023/0418372 A1* 12/2023 Agaoglu ................. G06F 3/013
2024/0020953 A1* 1/2024 Park ....................... G06V 20/56
2024/0071108 A1* 2/2024 Edwards ................ G06V 40/20
2024/0112396 A1* 4/2024 Spencer .................. G06T 15/20
2024/0166048 A1* 5/2024 Chen ...................... B60K 35/22
2024/0221205 A1* 7/2024 Wang ........................ G06T 7/73
2024/0294115 A1* 9/2024 Komatsu ................... B60R 1/22
2024/0385436 A1* 11/2024 Dehkordi ........... G02B 27/0101
2024/0386600 A1* 11/2024 Hayashi ............ B60R 21/01538
2024/0414309 A1* 12/2024 He ........................ H04N 13/383
2024/0416923 A1* 12/2024 Almási .................. G06V 40/18
2025/0013417 A1* 1/2025 Dehkordi ................ G06F 9/451
2025/0022288 A1* 1/2025 Sivaraman ........... G06V 20/597
2025/0091434 A1* 3/2025 Barth ..................... G06V 20/52
2025/0121843 A1* 4/2025 Avadhanam .......... B60W 50/12
2025/0139995 A1* 5/2025 Miyadoh .............. G06V 10/987
2025/0182501 A1* 6/2025 Otomo ................. G06V 20/597
2025/0209833 A1* 6/2025 Takahashi ............ H04N 23/611
2025/0221647 A1* 7/2025 Ren ...................... A61B 5/0077
2025/0222934 A1* 7/2025 Ren ........................ G06V 40/10
2025/0252594 A1* 8/2025 Bramley ................... G06T 7/70
2025/0256724 A1* 8/2025 Bramley ............... B60W 40/08
2025/0284877 A1* 9/2025 Pandey ................. G06F 16/345
2025/0299426 A1* 9/2025 Dehkordi ................ G06F 3/013

FOREIGN PATENT DOCUMENTS

| | | | |
|---|---|---|---|
| CN | 108600733 | A | 9/2018 |
| CN | 108769664 | A | 11/2018 |
| CN | 113821107 | A | 12/2021 |
| CN | 113920280 | A | 1/2022 |
| CN | 114040184 | A | 2/2022 |
| CN | 114840084 | A | 8/2022 |
| DE | 102014205519 | A1 | 10/2015 |
| JP | 2011004388 | A | 1/2011 |
| JP | 2015215505 | A | 12/2015 |
| JP | 2020170979 | A | 10/2020 |
| JP | 2021149442 | A | 9/2021 |
| WO | 2014136144 | A1 | 9/2014 |
| WO | 2015152776 | A1 | 10/2015 |
| WO | 2018116580 | A1 | 6/2018 |
| WO | 2018222753 | A1 | 12/2018 |

OTHER PUBLICATIONS

Kobayashi et al.,, "Development of a layered 3D display and implementation of real-time display", Feb. 29, 2016, Institute of Electronics, Information and Communication Engineers, 2 pages. Machine Translated.

Wang, et al., "3D VR interaction using mobile display movements", CiNii Research Entertainment Computing Symposium 2014 Proceedings 63-66, Sep. 12, 2014, 2 pages. Machine Translated.

Chinese Office Action corresponding to CN Application No. 202211641220.1; Issue Date, Feb. 19, 2025, 9 pages.

Extended European Search Report for EP Application No. 23214229.9; Mailing Date, Apr. 3, 2024.

Korean Request for the Submission of an Opinion corresponding to KR Application No. 10 2023 0172085; Issue date, Aug. 13, 2025, 18 pages.

* cited by examiner

METHOD AND DEVICE FOR NAKED EYE 3D DISPLAYING VEHICLE INSTRUMENT

CROSS REFERENCE TO RELATED APPLICATION

The present application claims priority of Chinese patent publication, with application No. 202211651220.1, submitted to CNIPA on Dec. 21, 2022; the content of which is incorporated in the present application by reference.

TECHNICAL FIELD

The present application relates to the field of naked eye 3D technology, and more particularly to a method and a device for naked eye 3D displaying a vehicle instrument.

BACKGROUND

Compared with traditional 2D displays, 3D displays are more compatible with human visual features, such that people feel more three-dimensional and immersive when watching scenes. The naked eye 3D technology is realized based on the disparity of the human eye, which means that there may be differences in the image between the left and right eyes when observing the same object. By doing some processing on the screen, the images with disparity are mapped to the left and right eyes of the person, and the human brain will merge into a three-dimensional image having a deep sense of depth.

If the naked eye 3D is applied to vehicle instruments, with its advantages of realism, stereoscopic effect, and no need to wear special glasses, it can display road condition information and vehicle condition information more intuitively and in real time, which can bring a better driving experience. However, the display of naked eye 3D has many limitations on the observation position. Generally, observers need to be fixed in the best place to observe the best display effect. When the naked eye 3D is applied to the vehicle instruments, the head of the operator will shift when observing road conditions, which can affect the display effect of naked eye 3D, such as the display screen refresh not keeping up: and the delayed refresh response of the naked eye 3D displaying may cause the operator to feel dizzy, which is extremely dangerous during driving.

SUMMARY

Embodiments of the present application provide a method and a device for naked eye 3D displaying a vehicle instrument, which can solve the problem that the delayed refresh response of the naked eye 3D displaying may cause the operator to feel dizzy.

In a first aspect, an embodiment of the present application provides a method for naked eye 3D displaying a vehicle instrument, and the method includes:

- collecting a real-time eye position of an operator in a real time, generating a corresponding real-time visual interweaving image according to the real-time eye position, and displaying the real-time visual interweaving image on a display interface:
- identifying whether the operator is engaged in human behavior, if so, obtaining human behavior information of the operator;
- predicting a deviation interval of the operator according to the human behavior information, and generating and caching a viewing angle image set corresponding to the deviation interval: and compensating in response to the real-time visual interweaving image on the display interface according to the viewing angle image set.

As an example, the step of generating the corresponding real-time visual interweaving image according to the real-time eye position includes:

- determining a visual area interval according to the real-time eye position, and generating a 3D model scene of the visual area interval in a graphics library: and configuring a virtual view point position corresponding to the real-time eye position in the graphics library, rendering in a real-time to generate the real-time visual interweaving image corresponding to the virtual view point position in the 3D model scene according to the virtual view point position.

It should be understood that in the step of determining the visual area interval according to the real-time eye position, which includes:

- obtaining a standard visual area where a viewing angle of a preset operation center is located; wherein the standard visual area is an angle range of several unit intervals on left and right sides of a horizontal direction of the viewing angle of the preset operation center, and each unit interval in the standard visual area is the visual area interval; and
- calculating the visual area interval where the real-time eye position is located according to a deviation angle between the real-time eye position and the viewing angle of the preset operation center.

In a second aspect, an embodiment of the present application provides a device for naked eye 3D displaying a vehicle instrument, and the device includes:

- a collection module, configured for collecting position information of an operator; wherein the collection module comprises a human eye positioning unit and a behavior recognition unit; the human eye positioning unit is configured for collecting a real-time eye position, and the behavior recognition unit is configured for obtaining human behavior information
- a calculation processing module, including a first calculation processing module and a second calculation processing module; wherein the first calculation processing module is configured for receiving the real-time eye position, calculating a current visual area interval, and generating a first interweaving image screen corresponding to the current view interval; the second calculation processing module is configured for predicting a deviation interval of the operator according to the human behavior information, and generating a second interweaving image screen corresponding to the deviation interval;
- a cache module, configured for caching the second interweaving image screen; and a display module, configured for displaying the first interweaving image screen and extracting the second interweaving image screen for refreshing.

In a third aspect, an embodiment of the present application provides a terminal device, which includes: a memory, a processor, and a computer program stored in the memory and capable of running on the processor, and the processor executes the computer program to implement the method for naked eye 3D displaying the vehicle instrument described in any one of the first aspect.

In a fourth aspect, an embodiment of the present application provides a computer-readable storage medium stores a computer program, wherein when the computer program is executed by a processor to implement the method for naked eye 3D displaying the vehicle instrument described in any one of the first aspect.

In a fifth aspect, an embodiment of the present application provides a computer program product, when the computer program product runs on a terminal device, causes the terminal device to execute to implement the method for naked eye 3D displaying the vehicle instrument described in any one of the first aspect.

It can be understood that the beneficial effects of the second to fifth aspects mentioned above can be found in the relevant description in the first aspect, and which will not be further repeated here.

The beneficial effects of the embodiments of the present application compared to the prior art are:

In the embodiments of the present application, by collecting position information of an operator, predicting a deviation interval of the operator and generating and caching a viewing angle image set corresponding to the deviation interval, so as to compensate in response to the real-time visual interweaving image. When the operator experiences a head rotation or other deviation from the original position, the displayed naked eye 3D screen refresh speed is reduced from 100 ms to within 30 ms, which reduces the dizziness when watching the naked eye 3D screen, and greatly improves the experience effect of 3D screen.

In the embodiments of the present application, the human eye positioning unit is used to collect real-time eye position, and to generate the first interweaving image corresponding to the current visual area interval and display the same: the behavior recognition unit is used to obtain the human behavior information, the deviation interval of the operator is predicted and the second interweaving image corresponding to the deviation interval is generated and cache the second interweaving image, which greatly reduces the burden on a single camera and improves the refresh speed of displaying the naked eye visual interweaving image.

Of course, the implementation of any product in the present application does not necessarily require the simultaneous realization of all the advantages mentioned above.

The above description is only a summary of the technical solution of the present application. In order to have a clearer understanding of the technical means of the present application, it can be implemented in accordance with the content of the specification. In order to make the purpose, features, and advantages of the present application more obvious and understandable, the specific implementation methods of the present application are listed below.

BRIEF DESCRIPTION OF THE DRAWINGS

In order to explain the embodiments of the present application more clearly, a brief introduction regarding the accompanying drawings that need to be used for describing the embodiments of the present application or the prior art is given below: it is obvious that the accompanying drawings described as follows are only some embodiments of the present application, for those skilled in the art, other drawings can also be obtained according to the current drawings on the premise of paying no creative labor.

FIG. 3 is a flowchart of a method for generating real-time visual interweaving images corresponding to the real-time eye position provided in an embodiment of the present application:

DETAILED DESCRIPTION OF EMBODIMENTS

Figure 1:
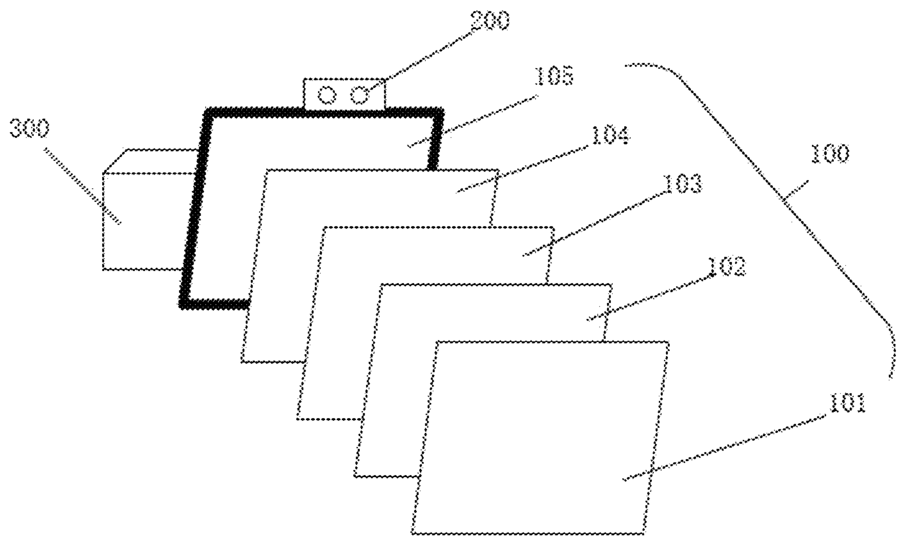
FIG. 1 is a partial structural schematic view of a vehicle instrument provided in an embodiment of the present application.

In the following description, specific details such as specific system architecture, technology, etc. are presented for illustration rather than qualification in order to fully understand the embodiments of the present application. However, it should be clear to those skilled in the art that the present application may also be realized in other embodiments without these specific details. In other cases, detailed descriptions of well-known systems, devices, circuits and methods are omitted so as not to prejudice the description of the present application with unnecessary details.

It is to be understood that when used in description of the present application and the accompanying claims, the term "includes" indicates the existence of the features, wholes, steps, operations, elements and/or components described, but does not exclude the existence or addition of one or more other features, wholes, steps, operations, elements, components and/or collections thereof.

It should also be understood that the term "and/or" as used in the description of the present application and the accompanying claims means any combination of one or more of the items listed in relation to them and all possible combinations thereof, and includes such combinations.

As used in the description of the present application and the accompanying claims, the term "if" may be construed in the context to mean "when . . . " or "once" or "in response to determination" or "in response to detection". Similarly, the phrase "if determined" or "if detected [described condition or event]" can be interpreted, depending on the context, to mean "once determined" or "in response to determined" or "once detected [described condition or event]" or "in response to detected [described condition or event]".

In addition, the terms "first", "second", "third", etc. in the description of the present application and the accompanying claims are used only to distinguish the description and are not to be construed as indicating or implying relative importance.

References to "one embodiment" or "some embodiments" as described in the present application description, etc., imply the inclusion in one or more embodiments of the present application of particular features, structures or features described in combination with that embodiment. Thus, the words "in one embodiment", "in some embodiments", "in some further embodiments", "in some other embodiments", etc., which appear in differences in the specification, do not necessarily all refer to the same embodiments, but mean "one or more but not all embodiments" unless otherwise specifically emphasized. The terms "including". "containing", "having" and their variations all mean "including but not limited to" unless otherwise specifically emphasized.

When naked-eye 3D is applied to the vehicle instrument, the head of the operator will shift when observing the road condition, and the naked-eye 3D display screen refresh response is not timely, which may cause the operator to feel dizzy. The embodiment of the present application aims to provide a method for naked eye 3D displaying a vehicle instrument, which can predict the deviation interval of the operator and generate the corresponding viewing angle image set to compensate in response to the real-time visual interweaving image, thus improving the display effect of naked eye 3D.

The method for naked eye 3D displaying the vehicle instrument provided in the embodiment of the present application can be applied to on-board apparatus and other terminal apparatus. As an example rather than a limitation, when the terminal apparatus is a vehicle apparatus, the vehicle apparatus can also be the application of vehicle apparatus technology for intelligent design of the vehicle, the development of a display function of the apparatus, such as vehicle instrument panel, display screen, etc.

Take the terminal apparatus as an example of a vehicle instrument. FIG. 1 shows a block diagram of the partial structure of the vehicle instrument provided in the embodiment of the present application. As shown in FIG. 1, the vehicle instrument includes: a display device 100, a camera group 200, a processor 300 and other components, the processor 300 and the display device 100 transmit data signals through active/wireless manner.

Specifically, the display device 100 includes a backlight for providing illumination, a grating for 3D imaging, and a imaging module for displaying the picture.

As an example rather than a limitation, the display device 100 includes a cover plate 101, a 3D grating 102, a Thin Film Transistor (TFT) module 103, a backlight module 104, and a housing 105. The cover plate 101, the 3D grating 102, the TFT module 103 and the backlight module 104 are wrapped in the housing 105, and the camera group 200 is arranged on the upper surface of the housing 105.

Specifically, the camera group 200 can be a dual camera module, and the camera group 200 includes any one or more combinations of RGB cameras, structured light cameras and IR cameras. It is understood that the working principle of the camera is: the light emitted to the object is reflected on the surface of the object, the reflected light is transmitted through the lens to the image sensor, the image sensor receives the reflected light and converts the optical signal into an electrical signal to be transmitted to the analog-to-digital conversion circuit; the analog-to-digital conversion circuit converts the received analog electrical signal into digital electrical signal and transmits it to the digital signal processing chip for processing. The final processed signal is transmitted to the computer through the USB interface, and the original image can be displayed through the monitor. Therefore, through the camera group 200, the facial and body image data of the vehicle, especially the operator, can be collected.

Alternatively, considering the implementation cost and the shooting of dark environment, the camera group 200 can be a combination of the RGB cameras and the IR cameras.

Specifically, a processor 300 May include one or more processors, such as a central processing unit (CPU), an application processor (AP), or a baseband processor and so on. The processor 300 can be the nerve center and command center of the wireless router. The processor 300 can generate the operation control signal according to the instruction operation code and the timing signal, and complete the control of fetching and executing instructions. Memory can be used to store computer executable program code, which includes instructions. The processor 300 performs various functional applications of network devices and data processing by running instructions stored in memory. The memory can include a storage program area and a storage data area, such as a storage visual interweaving image screen. For example, the memory can be double rate synchronous dynamic random access memory DDR or Flash flash, etc.

Although not indicated, the vehicle instrument can also include a power supply that supplies power to individual components, preferably, the power supply can be logically connected to the processor 300 through a power management system to manage charging, discharge, and power consumption and other function through the power management system.

It may be understood by those skilled in the art that the structure of the vehicle instrument shown in FIG. 1 does not constitute a limitation of the vehicle instrument and may include more or fewer parts than indicated, or may combine certain parts, or may be arranged differently.

Figure 2:
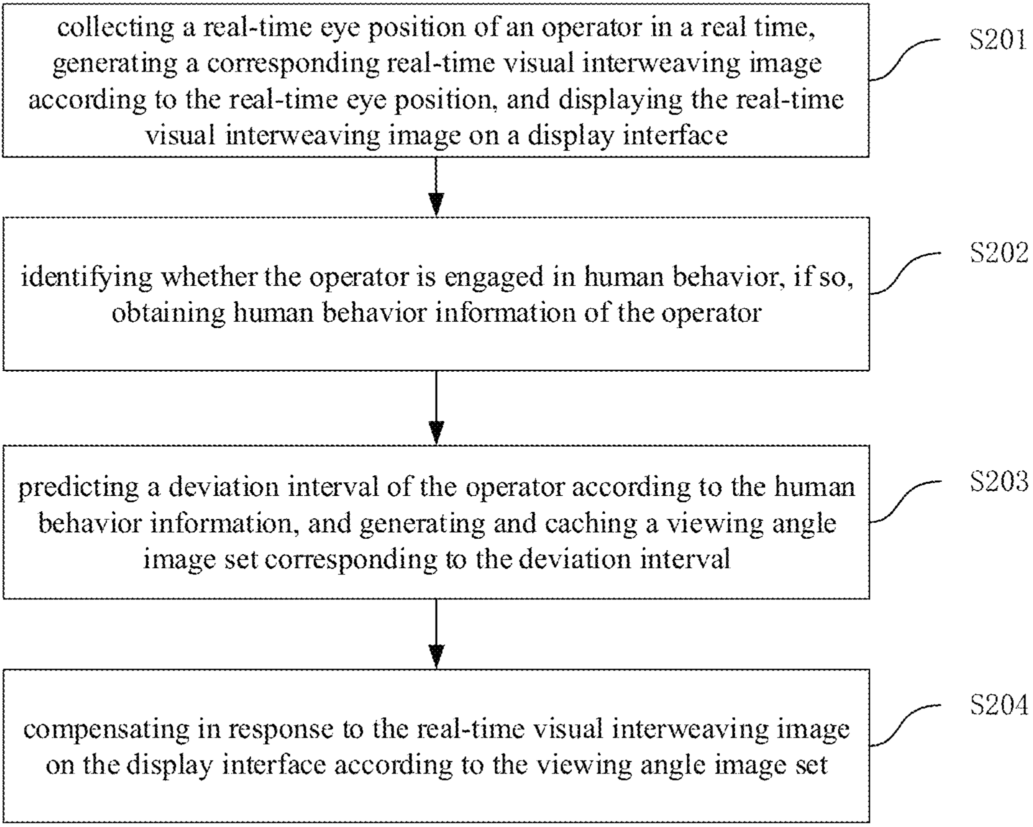
FIG. 2 is a flowchart of a method for naked eye 3D displaying a vehicle instrument provided in an embodiment of the present application.

The method for naked eye 3D displaying a vehicle instrument provided in the present application is illustrated by example in combination with specific embodiments. FIG. 2 shows the flowchart of the method for naked eye 3D displaying the vehicle instrument in an embodiment of the present application. As an example rather than a limitation, the method can be applied to the device for naked eye 3D displaying the vehicle instrument.

In step S201, collecting a real-time eye position of an operator in a real time, generating a corresponding real-time visual interweaving image according to the real-time eye position, and displaying the real-time visual interweaving image on a display interface.

In the embodiment, the collecting of the real-time eye position is obtained by image or video collecting by an image collection device equipped with an eye tracking system. The image collection device includes any one or several combinations of an infrared waterproof gun camera, an infrared hemisphere camera, a uniform ball machine, a high-speed ball machine, a wide dynamic camera, a video terminal, a video card and DVR (Digital Video Recorder). The image collection device can be selected according to the different environment and collecting requirements.

For example, the image collection device with the eye tracking system includes an infrared camera an infrared illuminator, and eye tracking algorithms for pupil center detection and artifact elimination, and the image processing and the data collection are handled by specialized hardware or by computers or software. Infrared based lighting has several advantages: the lighting is largely invisible to participants, and artifacts from artificial light sources can be filtered by wavelength. The real-time eye position obtained by the image collection device with a human eye tracking system includes the three-dimensional coordinates of the human eye relative to the earth coordinate system.

In one embodiment, FIG. 3 shows a flowchart of a method for generating real-time visual interweaving images corresponding to the real-time eye position provided in an embodiment of the present application, as an example rather than a limitation. The specific steps are as follows:

In step S301, obtaining a standard visual area where a viewing angle of a preset operation center is located.

Specifically, the standard visual area is an angle range of several unit intervals on left and right sides of a horizontal direction of the viewing angle of the preset operation center, and each unit interval in the standard visual area is the visual area interval.

For example, the center point of the operation position is the preset operation center, the connection line between the preset operation center and the optical center of the dual camera is the viewing angle of the preset operation center, the distance between the eyes of the operator and the optical center of the dual camera at the operation position is the observation distance, the line center of the optical centers of the dual camera is the vertex, and the observation distance is the side length: a sector interval that covers the operator's action range can be divided, and the sector interval is the standard visual area. Viewing angle of +/−25° range of the preset operation center is used as the standard visual area. The standard visual area is divided into 10 unit intervals, that is, every 5 degrees is used as a visual area interval.

In step S302, calculating the visual area interval where the real-time eye position is located according to a deviation angle between the real-time eye position and the viewing angle of the preset operation center.

The earth coordinate data of the real-time eye position is extracted, and the earth coordinate data of the line center of optical center of the dual camera is calculated according to the positioning information of the dual camera, and then the distance between the real-time eye position and the line center of optical center of the dual camera and the deviation angle between the real-time eye position and the deviation angle of the viewing angle of the preset operation center are calculated by a triangulation method.

The visual area interval where the real-time eye position is located is determined according to the degree of the deviation angle and the division of the unit intervals in the standard visual area.

In step S303: generating a 3D model scene of the visual area interval in a graphics library.

For example, the graphics library can be an open graphics library (OpenGL), a Direct 3D (3D graphics programming interface based on universal object mode of Microsoft) and other cross-language and cross-platform application programming interfaces for rendering 2D and 3D vector graphics.

Optionally, the open graphics library (OpenGL) is a cross-language, cross-platform application programming interface for rendering 2D and 3D vector graphics. In this embodiment, the OpenGL is used as the graphics library, the OpenGL engine environment is initialized, the data is prepared for rendering, and the corresponding 3D model scene is generated in the OpenGL according to the visual area interval where the real-time eye position is located.

In step S304, configuring a virtual view point position corresponding to the real-time human eye position in the graphics library, rendering in a real-time to generate the real-time visual interweaving image corresponding to the virtual view point position in the 3D model scene according to the virtual view point position.

In one embodiment, a virtual view point position corresponding to the view point of the actual human eye is configured in OpenGL according to the real-time eye position, and then a picture of the corresponding viewing angle is generated in real time and transmitted to the video memory, and then the LCD screen displays the picture.

Optionally, the Framebuffer uses a video output device to drive a video display device from a memory buffer containing complete frame data. In this embodiment, the Framebuffer is used as video memory, the real-time rendering of the generated images corresponding to the viewing angle is output to the display screen.

Optionally, a Liquid Crystal Display (LCD) is that a liquid crystal box is placed between two parallel glass substrates, a TFT (thin film transistor) is arranged on the lower substrate glass and a color filter is arranged on the upper substrate glass. By changing the signal and voltage on the TFT, the rotation direction of the liquid crystal molecule is controlled, so as to control whether the polarized light of each pixel is emitted or not and achieve the purpose of display. In this embodiment, LCD is used as the display screen to display the picture of the corresponding viewing angle described above.

It is understandable that OpenGL can also be used for local refresh in order to improve refresh efficiency when the virtual view point position changes little: the nodes whose states have changed during the rendering of the current frame are counted, the refresh area generated by all nodes with changed states is calculated, the refresh area corresponding to the screen area on the screen is calculated, the projection matrix, as well as the viewport and cropping area are arranged according to the screen area, and the obtained model data and texture data are submitted to the renderer for rendering, so as to obtain the corresponding real-time visual interweaving image.

In step S202, identifying whether the operator is engaged in human behavior, if so, obtaining human behavior information of the operator.

Figure 4:
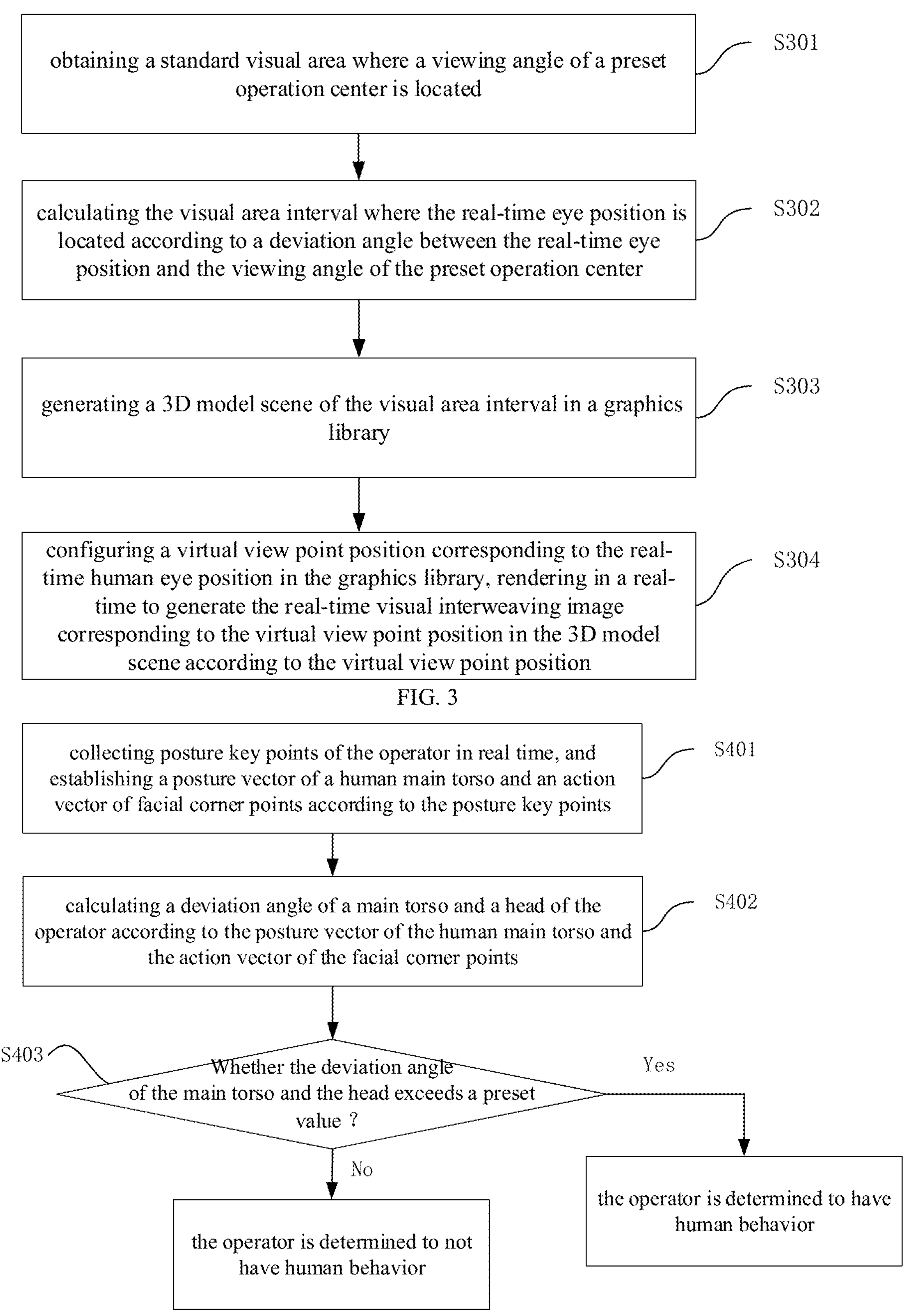
FIG. 4 is a flowchart of a method for identifying whether an operator has engaged in human behavior provided in an embodiment of the present application.

In one embodiment, since the human behavior of the operator being too large during driving is the main reason for the delayed response to the naked-eye 3D picture refresh, and the possible human behavior of the operator is mainly head turning and movement. Therefore, the camera is used to capture the face and main body posture information of the operator, it can extract the cached picture according to the human behavior of the operator, improve the refresh speed of the picture, and reduce the sense of dizziness when watching the naked eye 3D picture. FIG. 4 shows the method flowchart of identifying whether the operator has human behavior in the embodiment of the present application, as an example rather than a limitation. The specific steps are as follows:

In step S401, collecting posture key points of the operator in real time, and establishing a posture vector of a human main torso and an action vector of facial corner points according to the posture key points.

The camera is used to collect two-dimensional RGB image information of the human body, and no less than 18 key points of the human body are obtained from the two-dimensional RGB image according to the human posture estimation algorithm. By comparing with the standard human postures, the posture key points that can accurately describe human head rotation or upper body movement are obtained. The original data of posture key points in the image coordinate system is obtained using human posture estimation algorithms, and action vectors representing the main body posture vector and facial corners are constructed.

Optional, Openpose is an open source library of human posture recognition algorithms based on convolutional neural networks and supervised learning, which can realize posture estimation of human movements, facial expressions, finger movements, etc. In this embodiment, the Openpose is used to obtain the key points of the human body from the two-dimensional RGB image, and as an example rather than a limitation, the key points of the human body that number 1 (representing the nose), number 2 (representing the neck), number 3 (representing the right shoulder), number 6 (representing the left shoulder), number 15 (representing the right eye), number 16 (representing the left eye), etc. are taken as the posture key points.

In step 402, calculating a deviation angle of a main torso and a head of the operator according to the posture vector of the human main torso and the action vector of the facial corner points:

In step 403, performing determination of human behavior according to the deviation angle of the main torso and head, if the deviation angle of the main torso and the head exceeds a preset value, the operator is determined to have human behavior, and the deviation angle of the main torso and the head is used as the human behavior information that represents a tilt posture of a human body.

In step S203, predicting a deviation interval of the operator according to the human behavior information, and generating and caching a viewing angle image set corresponding to the deviation interval.

In one embodiment, human posture algorithm is used to integrate and identify human behavior information to obtain the operator behavior trend probability value.

As an example rather than a limitation, the human behavior information is extracted, and the deviation angle of the main torso of the operator constitutes the moving feature vector, and the deviation angle of the head of the operator constitutes the turning feature vector. The trained support vector machine (SVM) is used to determine the behavior of the moving feature vector, and the output first classification result is x:

$$x = \begin{cases} -1, & \text{moving to left} \\ 0, & \text{stay still} \\ 1, & \text{moving to right} \end{cases},$$

Similarly, a trained SVM can be used to determine the behavior of the turning feature vector, and the output second classification result is y:

$$y = \begin{cases} -1, & \text{turning head to left} \\ 0, & \text{stay still} \\ 1, & \text{turning head to right} \end{cases}$$

The behavior trend probability value of the operator is the sum of the first classification result x and the second classification result y.

It can be understood that the eye position of the operator in the next unit time can be predicted according to the human behavior trend probability value. For example, when the trend probability value is −1, the eye position of the operator in the next unit time is predicted to be in a visual area interval to the left of the current visual area interval, that is, the deviation interval of the operator is a visual area interval to the left of the current visual area interval.

As an example rather than a limitation, the OpenGL can also be used as a graphics library to generate and cache the viewing angle image set corresponding to the deviation interval.

The specific steps are as follows:

(1) generating a 3D model scene of the deviation interval in a graphics library: and (2) rendering to generate a cached image corresponding to each preset view point in the deviation interval according to preset view points of several visual area intervals preset in the deviation interval: and (3) taking the cached image corresponding to all the preset view points in the deviation interval as the viewing angle image set corresponding to the deviation interval.

Specifically, a number of view points are preset for each visual area interval. The preset view points of each visual area interval are evenly distributed in a circular direction in each visual area interval, with the line center of the optical centers of the dual camera as the vertex, and the angles between the preset view points of the adjacent visual area intervals are equal. The deviation angle between the preset view points of the visual area interval and the viewing angle of the preset operation center as the position information of the preset view points of the visual area interval. The view corresponding to the preset view point of the visual area interval is stored in memory in advance, and the viewing angle image set corresponding to the subsequent deviation interval is continuously refreshed in real time, so that the observer can see the best 3D picture at any time to further reduce the sense of dizziness. For example, 24 view points can be preset in each visual area interval.

In step S204, compensating in response to the real-time visual interweaving image on the display interface according to the viewing angle image set.

Figure 5:
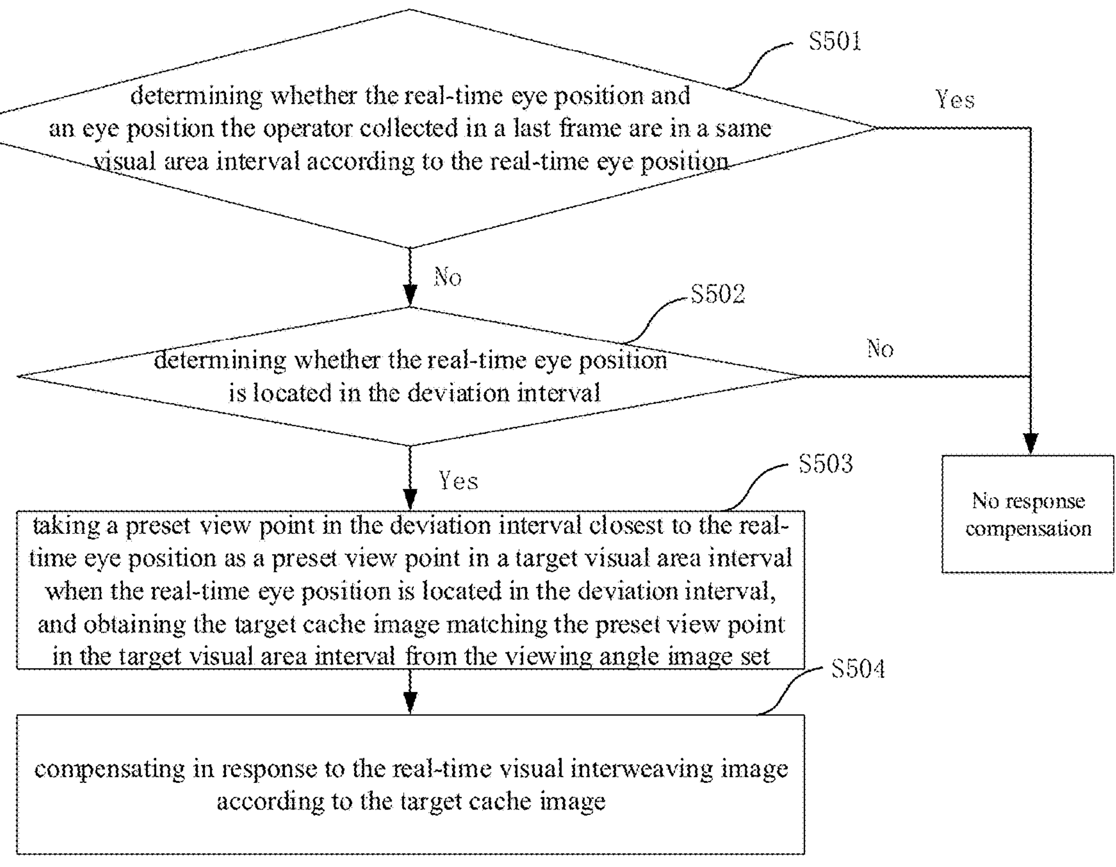
FIG. 5 is a flowchart of a method for response compensation of real-time visual interweaving images provided in an embodiment of the present application.

In one embodiment, FIG. 5 shows the method flowchart of compensating in response to a real-time visual interweaving image in an embodiment of the present application, as an example rather than a limitation. The specific steps are as follows:

In step S501, determining whether the real-time eye position and an eye position the operator collected in a last frame are in a same visual area interval according to the real-time eye position.

In this embodiment, the earth coordinate data of the eye position of the operator in each frame collected by the camera can be calculated by the triangle manner to obtain the distance between the eye position of the operator and the line center of optical centers of the dual camera, as well as the deviation angle between the eye position of the operator and the viewing angle of the preset operation center. Then, the visual area interval in which the eye position of the operator is located is determined according to the unit interval division of the degree of deviation angle between the eye position of the operator and viewing angle of the preset operation center.

The visual area interval of the eye position of the operator in the last frame is cached, and the calculated real-time visual area interval of the eye position of the operator is compared with the visual area interval of the eye position of the operator in the last frame to determine whether the two are the same: if yes, then the real-time eye position of the operator and the eye position of the operator collected in the last frame are in a same visual area interval.

In step S502, determining whether the real-time eye position is located in the deviation interval when the real-time eye position and the eye position the operator collected in the last frame are not located in the same visual area interval.

In step S503, taking a preset view point in the deviation interval closest to the real-time eye position as a preset view point in a target visual area interval when the real-time eye position is located in the deviation interval, and obtaining the target cache image matching the preset view point in the target visual area interval from the viewing angle image set.

In this embodiment, according to the deviation angle between the real-time eye position and the viewing angle of the preset operation center, the preset view point in the visual area interval closest to the real-time eye position is determined, and the nearest preset view point in the visual area interval is taken as the target preset view point, and the cache image corresponding to the target preset view point is extracted from the viewing angle image set as the target cache image.

In step S504, compensating in response to the real-time visual interweaving image according to the target cache image.

It can be understood that if the real-time eye position of the operator is not located in the deviation interval, the view corresponding to the nearest preset view point of the visual area interval of the real-time eye position is obtained from the memory, and the real-time visual interweaving image is compensated in response.

In another embodiment, considering that the brightness of the driving environment is too low; which will lead to poor naked eye 3D effect, and thus make the operator more prone to fatigue when viewing the naked eye 3D picture, the method for naked eye 3D displaying the vehicle instrument provided in the present application also includes a method to automatically turn off the naked eye 3D effect as an example rather than a limitation. The specific steps to automatically turn off the naked eye 3D effect are as follows:

(1) processing a brightness of captured images of RGB cameras by means of data frame average, and calculating a median value of data frame segment in a current environment;

(2) determining a working environment for the median value of the data frame segment of the current environment, and determining, if the median value of the data frame segment of the current environment is less than the preset reference threshold, that the environment light is insufficient, and perform frame measurement to compensate the situation of insufficient light by enabling IR cameras;

(3) automatically turning off the naked eye 3D effect to 2D display when the data measured by the IR cameras is less than the preset threshold, and turning off he eye-tracking system of the RGB cameras.

It should be understood that the sequence number of the steps in the above embodiments does not imply the order of execution, which shall be determined by its function and internal logic, and shall not constitute any limitation on the process of implementation in the embodiments of the present application.

Figure 6:
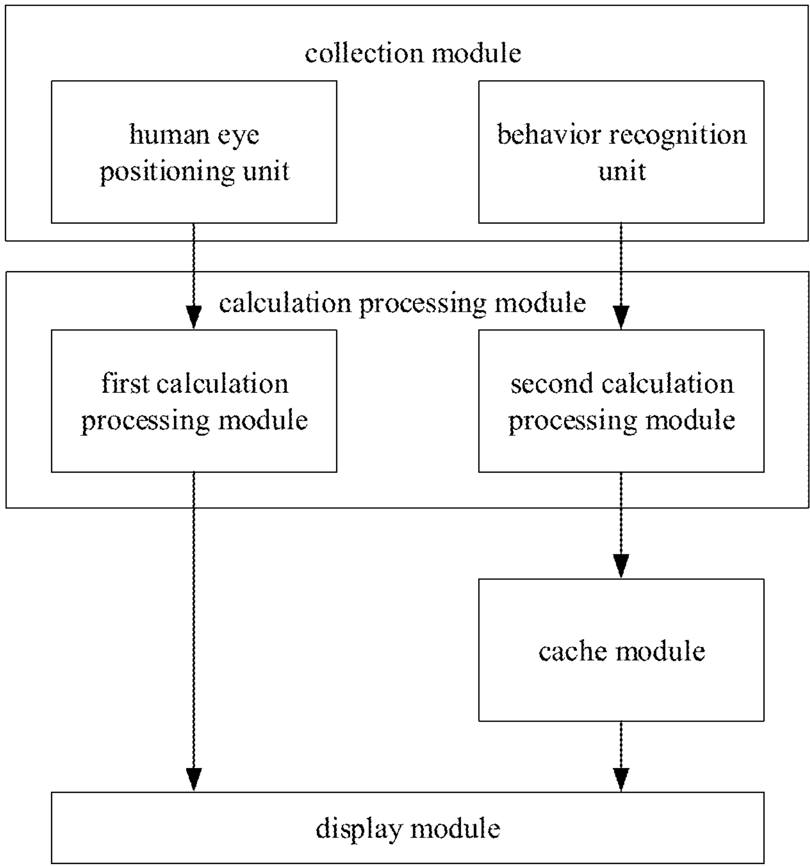
FIG. 6 is a structural block diagram of a device for naked eye 3D displaying a vehicle instrument provided in an embodiment of the present application.

FIG. 6 shows a structural block diagram of a device for naked eye 3D displaying a vehicle instrument corresponding to the method for naked eye 3D displaying a vehicle instrument in above embodiments, for ease of explanation, only the parts related to the embodiment of the present application are shown.

As shown in FIG. 6, the device includes:

a collection module, configured for collecting position information of an operator: and the collection module includes a human eye positioning unit and a behavior recognition unit: the human eye positioning unit is configured for collecting a real-time eye position, and the behavior recognition unit is configured for obtaining human behavior information;

a calculation processing module, including a first calculation processing module and a second calculation processing module: and the first calculation processing module is configured for receiving the real-time eye position, calculating a current visual area interval, and generating a first interweaving image screen corresponding to the current view interval: the second calculation processing module is configured for predicting a deviation interval of the operator according to the human behavior information, and generating a second interweaving image screen corresponding to the deviation interval;

a cache module, configured for caching the second interweaving image screen: and a display module, configured for displaying the first interweaving image screen and extracting the second interweaving image screen for refreshing.

It should be noted that the information interaction and execution process among the above devices/units are based on the same idea as the embodiments of method in the present application, and their specific functions and technical effects can be detailed in the embodiments of the method, which will not be repeated here.

Those skilled in the art can clearly understand that, in order to describe the convenience and simplicity, only the division of the above functional units and modules are illustrated by examples, in practical application, the above functions can be assigned by different functional units and modules according to needs, that is, the internal structure of the device is divided into different functional units or modules to complete all or part of the functions described above. Each functional unit and module in the embodiment can be integrated in a processing unit, or each unit can exist physically separately, or two or more units can be integrated in a unit, and the integrated unit can be realized in the form of hardware or software functional units. In addition, the specific names of each functional unit and module are only for the convenience of distinguishing between each other, and are not used to limit the scope of protection of the present application. The specific working process of the units and modules in the above system can refer to the corresponding process in the above-mentioned embodiments of the method, which will not be repeated here.

The embodiment of the present application further provides a network device, which includes at least one processor, a memory, and a computer program stored in the memory and capable of running on at least one processor, which implements the steps in any embodiments of the method above when executing the computer program.

The embodiment of the present application further provides a computer-readable storage medium that stores a computer program that, when executed by a processor, realizes the steps in any embodiments of the above method.

The embodiment of the present application provides a computer program product that, when run on a mobile terminal, enables the mobile terminal to execute the steps in any embodiments of the above method.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium. USB flash disk, mobile hard disk, hard disk, optical disk, computer storage device, ROM (Read-Only Memory), RAM (Random Access Memory), etc.

In the aforesaid embodiments, the description of each of the embodiments is emphasized respectively, regarding a part of one embodiment which isn't described or disclosed in detail, please refer to relevant descriptions in some other embodiments.

Those skilled in the art may aware that the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

The aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently: these amendments or equivalent replacements won't make the essence of corresponding technical solution to be broken away from the spirit and the scope of the technical solution in various embodiments of the present application.

The invention claimed is:

1. A method for naked eye 3D displaying a vehicle instrument, comprising:

collecting a real-time eye position of an operator in a real time, generating a corresponding real-time visual interweaving image according to the real-time eye position, and displaying the real-time visual interweaving image on a display interface;

identifying whether the operator is engaged in human behavior, if so, obtaining human behavior information of the operator, wherein the human behavior of the operator comprises head turning and movement of the operator;

predicting a deviation interval of the operator according to the human behavior information, and generating and caching a viewing angle image set corresponding to the deviation interval; and compensating in response to the real-time visual interweaving image on the display interface according to the viewing angle image set;

wherein the step of predicting the deviation interval of the operator according to the human behavior information comprises:

integrating and recognizing the human behavior information by a human posture algorithm to obtain a behavior trend probability value of the operator; and predicting the eye position of the operator in a next unit time according to the behavior trend probability value, and calculating the deviation interval of the operator according to the eye position of the operator in the next unit time.

2. The method for naked eye 3D displaying the vehicle instrument according to claim 1, wherein the step of generating the corresponding real-time visual interweaving image according to the real-time eye position comprises:

determining a visual area interval according to the real-time eye position, and generating a 3D model scene of the visual area interval in a graphics library; and configuring a virtual view point position corresponding to the real-time eye position in the graphics library, rendering in a real-time to generate the real-time visual interweaving image corresponding to the virtual view point position in the 3D model scene according to the virtual view point position.

3. The method for naked eye 3D displaying the vehicle instrument according to claim 2, wherein the step of determining the visual area interval according to the real-time eye position comprises:

obtaining a standard visual area where a viewing angle of a preset operation center is located; wherein the standard visual area is an angle range of several unit intervals on left and right sides of a horizontal direction of the viewing angle of the preset operation center, and each unit interval in the standard visual area is the visual area interval; and calculating the visual area interval where the real-time eye position is located according to a deviation angle between the real-time eye position and the viewing angle of the preset operation center.

4. The method for naked eye 3D displaying the vehicle instrument according to claim 1, wherein the step of identifying whether the operator is engaged in human behavior comprises:

collecting posture key points of the operator in real time, and establishing a posture vector of a human main torso and an action vector of facial corner points according to the posture key points; and calculating a deviation angle of a main torso and a head of the operator according to the posture vector of the human main torso and the action vector of the facial corner points, if the deviation angle of the main torso and the head exceeds a preset value, the operator is determined to have human behavior, and the deviation angle of the main torso and the head is used as the human behavior information that represents a tilt posture of a human body.

5. The method for naked eye 3D displaying the vehicle instrument according to claim 1, wherein the step of generating and caching the viewing angle image set corresponding to the deviation interval comprises:

generating a 3D model scene of the deviation interval in a graphics library; and rendering to generate a cached image corresponding to each preset view point in the deviation interval according to preset view points of several visual area intervals preset in the deviation interval, and taking the cached image corresponding to all the preset view points in the deviation interval as the viewing angle image set corresponding to the deviation interval.

6. The method for naked eye 3D displaying the vehicle instrument according to claim 5, wherein the step of compensating in response to the real-time visual interweaving image on the display interface according to the viewing angle image set comprises:

determining whether the real-time eye position and an eye position the operator collected in a last frame are in a same visual area interval according to the real-time eye position;

determining whether the real-time eye position is located in the deviation interval when the real-time eye position and the eye position the operator collected in the last frame are not located in the same visual area interval;

taking a preset view point in the deviation interval closest to the real-time eye position as a preset view point in a target visual area interval when the real-time eye position is located in the deviation interval, and obtaining a target cache image matching the preset view point in the target visual area interval from the viewing angle image set; and compensating in response to the real-time visual interweaving image according to the target cache image.

7. A terminal device, comprising a memory, a processor, and a computer program stored in the memory and capable of running on the processor, wherein the processor is configured to execute the computer program to implement steps:

collecting a real-time eye position of an operator in a real time, generating a corresponding real-time visual interweaving image according to the real-time eye position, and displaying the real-time visual interweaving image on a display interface;

identifying whether the operator is engaged in human behavior, if so, obtaining human behavior information of the operator, wherein the human behavior of the operator comprises head turning and movement of the operator;

predicting a deviation interval of the operator according to the human behavior information, and generating and caching a viewing angle image set corresponding to the deviation interval; and compensating in response to the real-time visual interweaving image on the display interface according to the viewing angle image set;

wherein the step of predicting the deviation interval of the operator according to the human behavior information comprises:

integrating and recognizing the human behavior information by a human posture algorithm to obtain a behavior trend probability value of the operator; and predicting the eye position of the operator in a next unit time according to the behavior trend probability value, and calculating the deviation interval of the operator according to the eye position of the operator in the next unit time.

8. A non-transitory computer-readable storage medium stores a computer program, which, when executed by a processor, causes the processor to implement steps:

collecting a real-time eye position of an operator in a real time, generating a corresponding real-time visual interweaving image according to the real-time eye position, and displaying the real-time visual interweaving image on a display interface;

identifying whether the operator is engaged in human behavior, if so, obtaining human behavior information of the operator, wherein the human behavior of the operator comprises head turning and movement of the operator;

predicting a deviation interval of the operator according to the human behavior information, and generating and caching a viewing angle image set corresponding to the deviation interval; and compensating in response to the real-time visual interweaving image on the display interface according to the viewing angle image set;

wherein the step of predicting the deviation interval of the operator according to the human behavior information comprises:

integrating and recognizing the human behavior information by a human posture algorithm to obtain a behavior trend probability value of the operator; and predicting the eye position of the operator in a next unit time according to the behavior trend probability value, and calculating the deviation interval of the operator according to the eye position of the operator in the next unit time.

* * * * *